United States Patent [19]

Nakhamkin

[11] Patent Number: 4,936,098
[45] Date of Patent: Jun. 26, 1990

[54] UTILIZATION OF CIRCULATING FLUIDIZED BED COMBUSTORS FOR COMPRESSED AIR ENERGY STORAGE APPLICATION

[75] Inventor: Michael Nakhamkin, Mountainside, N.J.

[73] Assignee: Gibbs & Hill, Inc., New York, N.Y.

[21] Appl. No.: 49,649

[22] Filed: May 13, 1987

[51] Int. Cl.$^5$ .................................... F02G 1/02
[52] U.S. Cl. ........................... 60/652; 60/659; 60/682; 60/684
[58] Field of Search ............... 60/650, 652, 659, 679, 60/682, 684, 655; 122/4 D

[56] References Cited

U.S. PATENT DOCUMENTS

| | | | |
|---|---|---|---|
| 3,871,172 | 3/1975 | Villiers-Fisher et al. | 60/39.02 |
| 3,913,315 | 10/1975 | Skinner | 60/39.18 R |
| 4,116,005 | 9/1978 | Willyoung | 60/655 |
| 4,150,547 | 4/1979 | Hobson | 60/682 X |
| 4,223,529 | 9/1980 | Willyoung | 60/39.18 A |
| 4,253,300 | 3/1981 | Willyoung | 60/39.18 B |
| 4,380,147 | 4/1983 | Zaba | 60/39.182 |
| 4,476,674 | 10/1985 | Berman | 60/39.182 |
| 4,498,286 | 2/1985 | Brannstrom et al. | 60/39.1 |
| 4,530,207 | 7/1985 | Brannstrom et al. | 60/39.464 |

Primary Examiner—Stephen F. Husar
Attorney, Agent, or Firm—Pennie & Edmonds

[57] ABSTRACT

A thermal energy peaking/intermediate power plant is disclosed having an atmospheric Fluidized Bed Combustor (FBC) for heating compressed air which is input to a turbine. Low-grade fuels such as coal may be combusted in the FBC, eliminating the need for additional combustors requiring premium fuels.

23 Claims, 1 Drawing Sheet

UTILIZATION OF CIRCULATING FLUIDIZED BED COMBUSTORS FOR COMPRESSED AIR ENERGY STORAGE APPLICATION

CROSS-REFERENCE TO RELATED APPLICATIONS

Related U.S. Patent applications are "Retrofit of Simple Cycle GAs Turbines For Compressed Air Energy Storage Application" (Ser. No. 049,650), new U.S. Pat. No. 4,872,307, "Compressed Air Energy Storage Turbomachinery Cycle with Compression Heat Recovery Storage, Steam Generation and Utilization During Power Generation" (U.S. Pat. No. 4,765,142), "Compressed Air Turbomachinery Cycle with Reheat and High Pressure Air Preheating in Recuperator" (Ser. No. 049,870) and "Advanced Recuperator" (Ser. No. 048,849), now U.S. Pat. No. 4,870,816, all of which are filed concurrently and are incorporated herein by reference.

BACKGROUND OF THE INVENTION

This invention relates generally to the use of a fluidized bed combustor for heating air and more specifically to the use of an atmospheric circulating fluidized bed combustor in a Compressed Air Energy Storage (CAES) system, thereby reducing or eliminating the need for conventional fuel combustors as well as premium fuels associated with such combustors.

Compressed Air Energy Storage power plants have become effective contributors to a utility's generation mix as a source of peaking or intermediate energy and spinning reserve. CAES plants store off-peak energy from relatively inexpensive energy sources such as coal and nuclear baseload plants by compressing air into storage devices such as underground caverns or reservoirs. Such underground storage can be developed in hard rock, bedded salt, salt dome or aquifer media. Following off-peak storage, the air is withdrawn from storage, heated, combined with fuel and expanded through expanders, i.e., turbines, to provide needed peaking/intermediate power. Since inexpensive off-peak energy is used to compress the air, the need for premium fuels, such as natural gas and imported oil, is reduced by as much as about two thirds compared with conventional gas turbines.

Compressors and turbines in CAES plants are each connected to a generator/motor device through respective clutches, permitting operation either solely of the compressors or solely of the turbines during appropriate selected time periods. During off-peak periods (i.e., nights and weekends), the compressor train is driven through its clutch by the generator/motor. In this scheme, the generator/motor functions as a motor, drawing power from a power grid. The compressed air is then cooled and delivered to underground storage.

During peak/intermediate periods, with the turbine clutch engaged, air is withdrawn from storage and provided to a combustor. The combustor combines the pre-heated compressed air with a fuel, such as No. 2 fuel oil, and expands the mixture of fuel and compressed air in a turbine, which provides power by driving the generator/motor. In this scheme, the generator/motor functions as a generator, providing power to a power grid. To improve the CAES heat rate, waste heat from a low pressure turbine exhaust is used to pre-heat high pressure turbine inlet air in a recuperator.

For a more complete discussion of CAES systems, see Nakhamkin, M. et al. "Compressed Air Energy Storage: Plant Integration, Turbomachinery Development", ASME International Gas Turbine Symposium and Exhibition, Beijing, Peoples' Republic of China, 1985 and Nakhamkin, M. et al. "Compressed Air Energy Storage (CAES): Overview, Performance and Cost Data for 25 MW to 220 MW Plants", Joint Power Generation Conference, Toronto, Canada 1984, both incorporated herein by reference.

Although CAES systems reduce the need for premium fuels by as much as about two thirds compared with conventional gas turbines, premium fuel such as natural gas or fuel oil is still required by combustors in conventional CAES systems. However, the use of premium fuels is severely restricted by institutional issues and requires special exemption from the Powerplant and Industrial Fuel Use Act of 1978.

It is therefore desirable to provide a peaking/intermediate system which does not require any premium fuel and which operates on the combustion of low grade fuels such as coal, municipal solid wastes, peat and the like.

Combustors which operate on low grade fuels are known. Illustrative of such a combustor is a system comprising a combustion chamber having a combustion air inlet, a fluidizing air inlet, a fuel/solid particle inlet and a heat transfer vessel such as a tubular coil containing a medium to be heated. In such a fluidized bed combustor, a quantity of solid particles are kept in turbulent motion by a fluidizing forced air stream input via a fluidizing air inlet. Such solid particles, illustratively limestone, in turbulent motion are known as a fluidized bed. Fuel may be added via the fuel inlet to such bed and combined with air from the combustion air inlet to provide heat to the heat transfer vessel submerged within or in close proximity to such bed. Hot solid particles and gases churn and surround the heat transfer vessel resulting in high heat transfer coefficients. Hot gases downstream from the fluidized bed similarly may be used to provide heat to an additional heat transfer device.

Environmentally, fluidized bed combustion is desirable since it permits the burning of coal in a bed of hot limestone. This is beneficial due to the availability of coal in the United States as well as the easily disposed dry calcium-sulfate waste product produced by the absorption of sulfur dioxide (released by burning coal) by calcium oxide from the calcination of limestone. Furthermore, emission of nitrogen oxides ($NO_x$) is minimal due to the relatively low combustion temperatures generally associated with FBCs (for example, 1400° F.–1700° F.).

Despite the above-enumerated advantages of Fluidized Bed Combustors (FBCs), difficulty has been encountered in their application to power generations systems. Illustrative of such FBC applications is U.S. Pat. No. 3,913,315 in which a FBC is utilized to heat compressed air of approximately 50 atm. However, this system requires the use of a pressurized fluidized bed combustion chamber in which the operating pressure of the combustion chamber is within one atmosphere of the compressed air pressure within the heat transfer device. Such Pressurized Fluidized Bed Combustors (PFBCs) have presented technological difficulties associated with elevated temperature operation. Additional U.S. Pat. Nos. disclosing known fluidized bed combustion devices are 4,476,674; 4,380,147; 4,223,529 and 4,116,005.

SUMMARY OF THE INVENTION

The present invention comprises a method and apparatus for heating air in an atmospheric Fluidized Bed Combustor (FBC), thereby reducing or eliminating the need for conventional combustors such as those in Compressed Air Energy Storage (CAES) systems. Furthermore, since low-grade fuels can be combusted in the atmospheric FBC, the need for premium fuels heretofore required in CAES systems is reduced and/or eliminated.

In the presently preferred embodiment, high pressure compressed air stored during a compression mode is pre-heated in a recuperator and then heated in an atmospheric FBC prior to expansion in a high pressure turbine. The high pressure turbine exhaust gas output is likewise heated in the FBC prior to expansion in a low pressure turbine. More specifically, high pressure compressed air from an air storage device is pre-heated in a recuperator and then heated to an intermediate temperature in a convection section of a convection bank. The high pressure compressed air then exits the convection section and enters a high pressure section of a solid particle fluidized bed air heater. This high pressure compressed air having an intermediate temperature is heated to a final temperature in the high pressure section of the air heater prior to expansion in a high pressure turbine. Such final heating is accomplished by combusting a low-grade fuel such as coal in a combustion chamber in which fluidizable solid particles such as limestone are fed. A hot cyclone recirculates such fluidized solid particles in close proximity to tubes within the air heater some of which contain high pressure compressed air (for input to a high pressure turbine) and some of which contain lower pressure compressed air (for input to a low pressure turbine).

Similarly, the exhaust gas output of the high pressure turbine is initially heated in the convection section of a convection bank. This high pressure turbine exhaust is then heated to a final temperature in the low pressure section of the air heater prior to expansion in a low pressure turbine. Such final heating of the high pressure turbine exhaust in the low pressure section of the air heater prior to expansion in a low pressure turbine is accomplished in a manner similar to the final heating of the high pressure compressed air from the recuperator in the high pressure section of the solid air heater prior to expansion in a high pressure turbine.

Through the use of an atmospheric FBC for heating air to be expanded in CAES turbines, the need for conventional combustion of premium fuels in combustors dedicated to individual turbines is eliminated.

Furthermore, the need for such combustors dedicated to individual turbines is also overcome.

Accordingly, it is a primary object of the present invention to provide a new and improved energy storage and recovery system.

A further object of the present invention is to provide a fluidized bed combustor for use in a CAES system.

Another object of the present invention is to provide an improved system for heating compressed air utilizing a fluidized bed combustor.

Another object of the invention is to provide a CAES system with a combustion sub-system which does not require the use of premium fuels and which replaces conventional fuel combustors.

BRIEF DESCRIPTION OF THE DRAWINGS

These and other objects, features and advantages of the invention will become more readily apparent with reference to the following description of the invention in which.

DETAILED DESCRIPTION OF THE INVENTION

Figure 1:
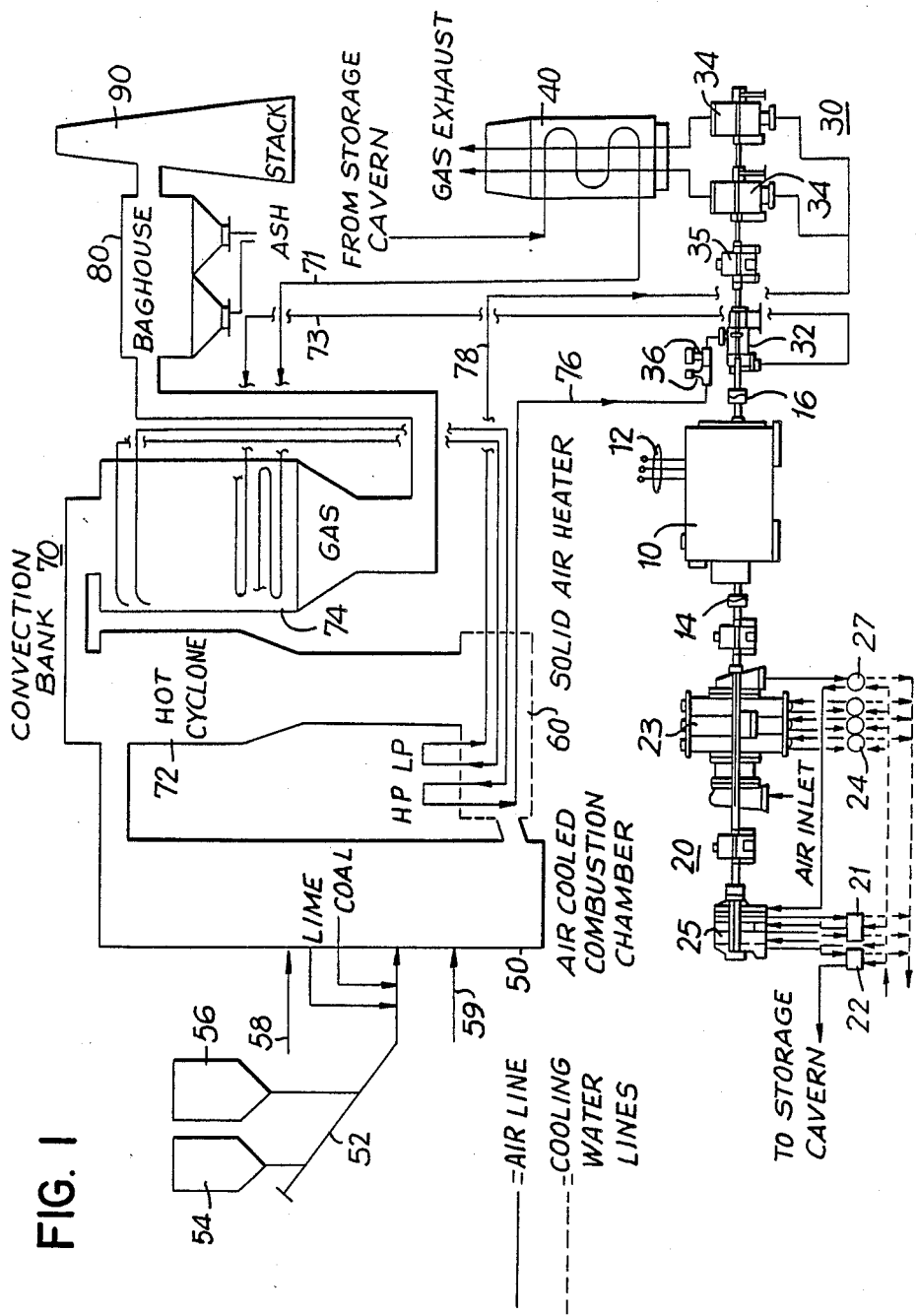
FIG. 1 is a schematic arrangement of a preferred embodiment of a CAES system utilizing an atmospheric FBC and having a solid air heater with separate high pressure and low pressure sections.

Referring to FIG. 1, there is shown a preferred embodiment of the present invention comprising a motor/generator 10, a compression train 20, a turbine train 30, a recuperator 40, a combustion chamber 50, a solid air heater 60 and a convection bank 70.

More specifically, motor/generator 10 is connected to a baseload power generating plant via power transmission line 12. Motor/generator 10 is also physically coupled to compression train 20 through a clutch 14 by which it may be selectively connected or disconnected to the compression train. The output of compression train 20 is compressed air that is input to an aftercooler 22 which cools the compressed air before entering a storage device (not shown).

In the preferred embodiment, compression train 20 further comprises a low pressure compressor 23 and a high pressure compressor 25 in order to efficiently compress air to required storing and operating pressures. Low pressure compressor 23 compresses ambient air and inputs such initially compressed air into high pressure compressor 25 which further compresses the air. Low pressure compressor 23 further comprises internal intercoolers 24 and external intercooler 27 to provide cooling to the compressed air entering high pressure compressor 25, thereby reducing the work of compression and avoiding the use of costly high temperature materials for the compressor hardware.

Similarly, high pressure compressor 25 further comprises external intercoolers 21 which likewise reduce the work of compression and avoid the use of costly high temperature materials for the compressor hardware. Additionally, high pressure compressor 25 is provided with an aftercooler 22. Aftercooler 22 further cools the compressed air to a temperature adequate for storage in a storage device (not shown).

Generator/motor 10 is disconnectably coupled to turbine train 30 through clutch 16. Turbine train 30 comprises a high pressure turbine 32 and a low pressure turbine 34 coupled together by gear mechanism 35. Control/trip valve 36 controls the flow of heated compressed air which is initially input to high pressure turbine 32.

Recuperator 40 is preferably provided to increase the efficiency of the expansion process in turbine train 30. Recuperator 40 utilizes the hot exhaust output of low pressure turbine 34 to pre-heat compressed air from the air storage device (not shown) and provide such pre-heated compressed air to an atmospheric Fluidized Bed Combustor (FBC) for final heating and subsequent input to high pressure turbine 32.

The atmospheric FBC of the presently preferred embodiment comprises a combustion chamber 50, an air heater 60, and a convection bank 70. Combustion chamber 50 is fed by ramp 52 with a supply of coal from coal silo 54 and with a supply of limestone from limestone silo 56. Combustion chamber 50 is preferably air cooled and is provided with a primary combustion air inlet 58 as well as a secondary fluidizing air inlet 59. Air supplied to air inlets 58, 59 is generally used for combustion of the coal in combustion chamber 50 and is preferably pre-heated by passage through convection bank 70 in a closed vessel.

Air heater 60 is an external air heater having high pressure and low pressure sections which heat high pressure air and low pressure air previously pre-heated in a convection section 74 of convection bank 70. Air heater 60 comprises a containment vessel within which fluidized solids are recirculated from hot cyclone 72, thus heating high pressure and low pressure tubes contained within the containment vessel and surrounded by the fluidized solids. High pressure air heated by air heater 60 is input via feed line 76 to high pressure turbine 32 for driving motor/generator 10 and thus supplying power to a power grid. Similarly, low pressure air heated by solid air heater 60 is input via feed line 78 to low pressure turbine 34 for driving motor/generator 10.

Convection bank 70 comprises a hot cyclone section 72 and a convection section 74. Combustion chamber 50 provides hot cyclone section 72 with heated gas from the combustion of coal as well as fluidized fine solids for use in heating high pressure and low pressure air in air heater 60. Convection section 74 heats high pressure air which has been pre-heated by recuperator 40 and suppled to convection section 74 by feed line 71. Such pre-heated high pressure air from recuperator 40 is further heated by convection section 74 prior to final heating by air heater 60. Similarly, convection section 74 heats low pressure air supplied via feed line 73 from the exhaust gas output of high pressure turbine 32. Such heated low pressure turbine air is further heated by convection section 74 prior to final heating by air heater 60.

The fluidized bed combustor further comprises a baghouse 80 and a stack 90. Baghouse 80 consolidates waste ash for disposal. Additionally, provisions for waste output and disposal may be made in combustion chamber 50, air heater 60, hot cyclone section 72 and convection section 74. Stack 90 provides an exit for exhaust gas used in the fluidized bed combustor portion of the present invention.

Table I sets forth operating parameters associated with a specific implementation of the invention which utilizes an atmospheric FBC and has separate high pressure and low pressure air heaters. More specifically, the parameters relate to a 50 MW plant having turbines with a maximum inlet pressure of 45 bar, high pressure air convection section heating, high pressure air external air heating and low pressure air external air heating. Low pressure air external air heating is accomplished by use of a shell and tube type air heater in which hot circulated solids are transported vertically through the tubes in a dilute phase suspension. A portion of the total combustion air is used as the fluidizing medium. The low pressure air passes countercurrently through the shell to attain the desired reheat temperature at minimum pressure loss.

TABLE I

| ATMOSPHERIC FBC OPERATING PARAMETERS | | | | |
|---|---|---|---|---|
| | HP Heater | | LP Heater | |
| | In | Out | In | Out |
| Compressed Air (with recuperator): | | | | |
| Pressure, psia | 666 | 646 | 147 | 142.5 |
| Temp., °F. | 499 | 1000 | 610 | 1300 |
| Flow Rate, lb/sec. | | 177.8 | | |
| Compressed Air (without recuperator): | | | | |
| Pressure, psia | 666 | 646 | 147 | 142.5 |
| Temp., °F. | 80 | 1000 | 610 | 1300 |
| Flow Rate, lb/sec. | | 177.8 | | |
| | | With Rec. | | Without Rec. |
| Fuel, Sorbent and Ash (lb/hr): | | | | |
| Coal Consumption* | | 22,080 | | 29,580 |
| Limestone Usage | | 640 | | 860 |
| Waste Solids | | 3,370 | | 4,520 |
| Auxiliary Loads (KW): | | | | |
| Primary/Fluidizing Fans | | 227 | | 304 |
| Secondary Fan | | 36 | | 48 |
| Induced Draft Fan | | 332 | | 444 |

*Based on Fuel with heating value 15,000 Btu/lb.

As indicated in Table I, the present invention may be utilized in CAES systems not provided with a recuperator, however, additional fuel consumption will be required to pre-heat primary, secondary, fluidizing and transport air.

While the teachings of the present invention may be practiced in other fields benefitting from the use of low-grade fuels, or in an application not utilizing a recuperator, the invention will be described in an application relating to CAES systems in which compressed air preheated in a recuperator is further heated in an atmospheric FBC for expansion in a high pressure turbine and the high pressure turbine's output is also heated in the atmospheric FBC prior to expansion in a low pressure turbine.

More specifically, high pressure compressed air exiting recuperator 40 enters convection section 74 of convection bank 70 of the FBC where the high pressure compressed air is preheated to an illustrative intermediate temperature of 918° F. The intermediate temperature is determined by optimizing the quantity of combustion air to be pre-heated in convection section 74 and then utilizing the remainder of flue gas energy in the convection section to heat the high pressure compressed air from the recuperator.

Subsequent to heating in the convection section, the high pressure compressed air is directed to air heater 60 for final heating to an illustrative temperature of 1000° F. in tubes surrounded by fluidized fine solids recirculated by hot cyclone section 72. This high pressure air at 1000° F. is then directed to an inlet of a high pressure turbine, where it is expanded, thus driving a motor/generator functioning as a generator.

The high pressure turbine exhaust similarly enters convection section 74 of convection bank 70 where it is further heated. Subsequent to heating in the convection section, the high pressure turbine exhaust is directed to the air heater 60 for final heating to an illustrative temperature of 1300° F. in tubes surrounded by fluidized fine solids recirculated by hot cyclone section 72. This air at 1300° F. is then directed to an inlet of a low pressure turbine where it is expanded, thus driving the motor/generator functioning as a generator.

Since parameters such as temperature and pressure associated with compressors, turbines, recuperators and FBCs depend largely on the characteristics of the specific system in use, the parameters set forth herein are not absolute, but rather are illustrative and meant to provide the reader with an appreciation of the interaction among and relative proportions of such parameters.

Furthermore, it is to be understood that the present invention, as claimed, includes the use of FBCs replacing all or only a portion of the total quantity of combustors in a CAES system as well as the use or absence of separate high pressure and low pressure air sections and/or heaters. Numerous arrangements exist for the location of heat transfer surfaces for heating primary, secondary, transportation and fluidizing air flows.

Thus it can be seen that there is provided a CAES system whereby an atmospheric fluidized bed combustor is utilized to sufficiently heat compressed air input to a turbine, thereby eliminating the need for other combustors and, most significantly, premium fuels.

In addition, it is to be understood that the invention can be carried out by specifically different equipment and devices and that various modifications, both as to equipment details and operating procedures can be effected without departing from the spirit and scope of the claimed invention.

What is claimed is:

1. A Compressed Air Energy Storage (CAES) system comprising:
    an electrical machine for use as a motor during a compression mode and for use as a generator during an expansion mode;
    a compression train which compresses air and stores such compressed air in an air storage device during said compression mode, said compression train being selectively coupled to said motor by way of a first clutch means;
    a turbine train which expands said compressed air from said air storage device during said expansion mode, said turbine train being selectively coupled to said generator by way of a second clutch means;
    a heat recuperator for pre-heating said compressed air from said air storage device prior to expansion in said turbine train; and
    an atmospheric fluidized bed combustor (FBC) for further heating said compressed air from said preheating means prior to expansion in said turbine train, said atmospheric FBC including a combustion chamber for combustion of low-grade fuel, said combustion chamber having a fuel input, a bed of fluidizable solid particles, an input to receive said fluidizable solid particles, a primary combustion air inlet and a secondary fluidizing air inlet.

2. The CAES system of claim 1 wherein said compression train comprises:
    a low pressure compressor to initially compress ambient air to a first pressure level;
    a high pressure compressor having an input connected to an output of said low pressure compressor for further compressing air at said first pressure level to an increased second pressure level and subsequently storing such air at said second pressure level in said air storage device.

3. The CAES system of claim 1 wherein said turbine train comprises:
    a high pressure turbine to initially expand compressed air output by said atmospheric fluidized bed combustor; and
    a low pressure turbine to further expand compressed air output by said high pressure turbine.

4. The CAES system of claim 3 wherein said compressed air output by said high pressure turbine is heated in said atmospheric fluidized bed combustor prior to input to said low pressure turbine.

5. The CAES system of claim 3 wherein the compressed air from said air storage device is heated in said atmospheric fluidized bed combustor prior to input to said high pressure turbine.

6. In a thermal power plant of the type which produces compressed air by use of excess energy generated during off-peak load periods and accumulates such compressed air in a storage device, the stored compressed air being withdrawn from said storage device and delivered to a turbine during peak load periods for generation of additional energy, the improved comprising:
    a heat recuperator for pre-heating said compressed air from said storage device prior to delivery to said turbine, said heat recuperator obtaining heat from a turbine exhaust of said turbine; and
    an atmospheric fluidized bed combustor (FBC) for heating said compressed air from said heat recuperator prior to expansion of said compressed air in said turbine.

7. The thermal power plant of claim 6 wherein said atmospheric FBC comprises a combustion chamber for combustion of low-grade fuel, said combustion chamber having a fuel input, a bed of fluidizable solid particles, an input to receive said fluidizable solid particles, a primary combustion air inlet and a second fluidizing air inlet.

8. The thermal power plant of claim 7 wherein said turbine comprises a high pressure turbine and a low pressure turbine, and said atmospheric FBC heats said compressed air from said heat recuperator prior to expansion of said compressed air in said high pressure turbine, and said atmospheric FBC heats an exhaust gas output by said high pressure turbine prior to expansion in said low pressure turbine.

9. The thermal power plant of claim 8 wherein said atmospheric FBC further comprises a convection bank and a solid particle fluidized bed air heater having a high pressure section, said compressed air being heated in said convection bank and said high pressure section, and said solid particle fluidized bed air heater having a low pressure section, said exhaust gas being heated in said convection bank and said low pressure section.

10. A method for generating peaking or intermediate electricity from expansion of compressed air comprising the steps of:
    compressing a quantity of air during an off-load period;
    storing said compressed air in an air storage device;
    pre-heating compressed air from said air storage device in a heat recuperator;
    heating said pre-heated compressed air in an atmospheric fluidized bed combustor (FBC) during a peaking or intermediate period, said atmospheric FBC including a combustion chamber for combusting low-grade fuels;
    expanding said heated compressed air in a high pressure turbine coupled to an electric generator; and
    supplying said expanded heated air from the turbine to the recuperator to pre-heat the compressed air.

11. The method of claim 10 further comprising the steps of:
    heating an exhaust gas output by said high pressure turbine in said atmospheric fluidized bed combustor during a peak period; and expanding said heated exhaust gas in a low pressure turbine coupled to said electric generator.

12. In a Compressed Air Energy Storage (CAES) system having a compression train and a turbine train, the improvement which permits the use of low grade fuel comprising the steps of:
supplying heat in the form of exhaust gas from said turbine train to a heat recuperator;
pre-heating, in said heat recuperator, compressed air from a compressed air storage device by transferring heat from said exhaust gas to said compressed air;
heating said pre-heated compressed air in an atmospheric fluidized bed combustor during a peak period; and
expanding said heated compressed air in a high pressure turbine.

13. The Compressed Air Energy Storage (CAES) system of claim 12 further comprising the steps of heating said expanded compressed air from the high pressure turbine in said atmospheric fluidized bed combustor and expanding said heated expanded compressed air in a low pressure turbine.

14. In a Compressed Air Energy Storage (CAES) system having a compression train and a turbine train in which the turbine train comprises a high pressure turbine and a low pressure turbine, the improvement comprising the steps of:
heating compressed air prior to expansion in said high pressure turbine, said heating including heating in an atmospheric fluidized bed combustor (FBC), said atmospheric FBC combusting low-grade fuel in a combustion chamber having a fuel input, a bed of fluidizable solid particles, an input to receive said fluidizable solid particles, a primary combustion air inlet and a secondary fluidizing air inlet;
expanding said heated compressed air in said high pressure turbine;
heating an exhaust gas output by said high pressure turbine in said atmospheric fluidized bed combustor; and
expanding said heated exhaust gas in said low pressure turbine.

15. The Compressed Air Energy Storage (CAES) system of claim 14 wherein said compressed air is supplied by an air storage device and is pre-heated prior to input to said atmospheric fluidized bed combustor.

16. The Compressed Air Energy Storage (CAES) system of claim 14 wherein said step of heating compressed air in an atmospheric FBC includes heating said compressed air in a convection bank and in a high pressure section of a solid particle fluidized bed air heater, and said step of heating said exhaust gas includes heating said exhaust gas in said convection bank and in a low pressure section of said solid particle fluidized bed air heater.

17. A Compressed Air Energy Storage (CAES) system comprising:
an electrical machine for use as a motor during a compression mode and for use as a generator during an expansion mode;
a compression train which compresses air and stores such compressed air in an air storage device during said compression mode, said compression train being selectively coupled to said motor by way of first clutch means;
a turbine train which expands said compressed air from said air storage device during said expansion mode, said turbine train being selectively coupled to said generator by way of said second clutch means;
means for pre-heating said compressed air from said air storage device prior to expansion in said turbine train; and
an atmospheric fluidized bed combustion (FBC) for further heating said compressed air from said pre-heating means prior to expansion in said turbine train, said atmospheric FBC including a combustion chamber for combustion of low-grade fuel, said combustion chamber having a fuel input, a bed of fluidizable solid particles, an input to receive said fluidizable solid particles, a primary combustion air inlet and a secondary fluidizing air inlet.

18. The CAES system of claim 17 wherein said atmospheric fluidized bed combustor further comprises a convection bank operatively associated with said combustion chamber for heating compressed air from said air storage device for subsequent expansion in a high pressure turbine of said turbine train.

19. The CAES system of claim 17 wherein said atmospheric fluidized bed combustor further comprises a convection bank operatively associated with said combustion chamber for heating exhaust gas output by a high pressure turbine of said turbine train for subsequent expansion in a low pressure turbine of said turbine train.

20. In a thermal power plant of the type which produces compressed air by use of excess energy generated during off-peak load periods and accumulates such compressed air in a storage device, the stored compressed air being withdrawn from said storage device and delivered to a turbine during peak load periods for generation of additional energy, the improvement comprising:
an atmospheric fluidized bed combustor for heating said compressed air from said storage device prior to expansion of said compressed air in said turbine, said atmospheric fluidized bed combustor including a combustion chamber for combustion of low-grade fuel, said combustion chamber having a fuel input, a bed of fluidizable solid particles, an input to receive said fluidizable solid particles, a primary combustion air inlet and a secondary fluidizing air inlet.

21. The thermal power plant of claim 20 wherein heated ambient air is input to said primary combustion air inlet and to said secondary fluidizing air inlet.

22. The thermal power plant of said claim 20 wherein said atmospheric fluidized bed combustor further comprises a convection bank operatively associated with said combustion chamber for heating high pressure compressed air from said air storage device for subsequent expansion in a high pressure turbine.

23. The thermal power plant of claim 20 wherein said atmospheric fluidized bed combustor further comprises a convection bank operatively associated with said combustion chamber for heating exhaust gas output by a high pressure turbine for subsequent expansion in a low pressure turbine.

* * * * *